Sept. 6, 1938.  V. CATINI  2,129,605

MACHINE FOR MAKING BOOKBINDER ELEMENTS

Filed Aug. 4, 1937  6 Sheets-Sheet 1

INVENTOR
VINCENZO CATINI
BY
ATTORNEYS

Sept. 6, 1938.  V. CATINI  2,129,605
MACHINE FOR MAKING BOOKBINDER ELEMENTS
Filed Aug. 4, 1937  6 Sheets-Sheet 2
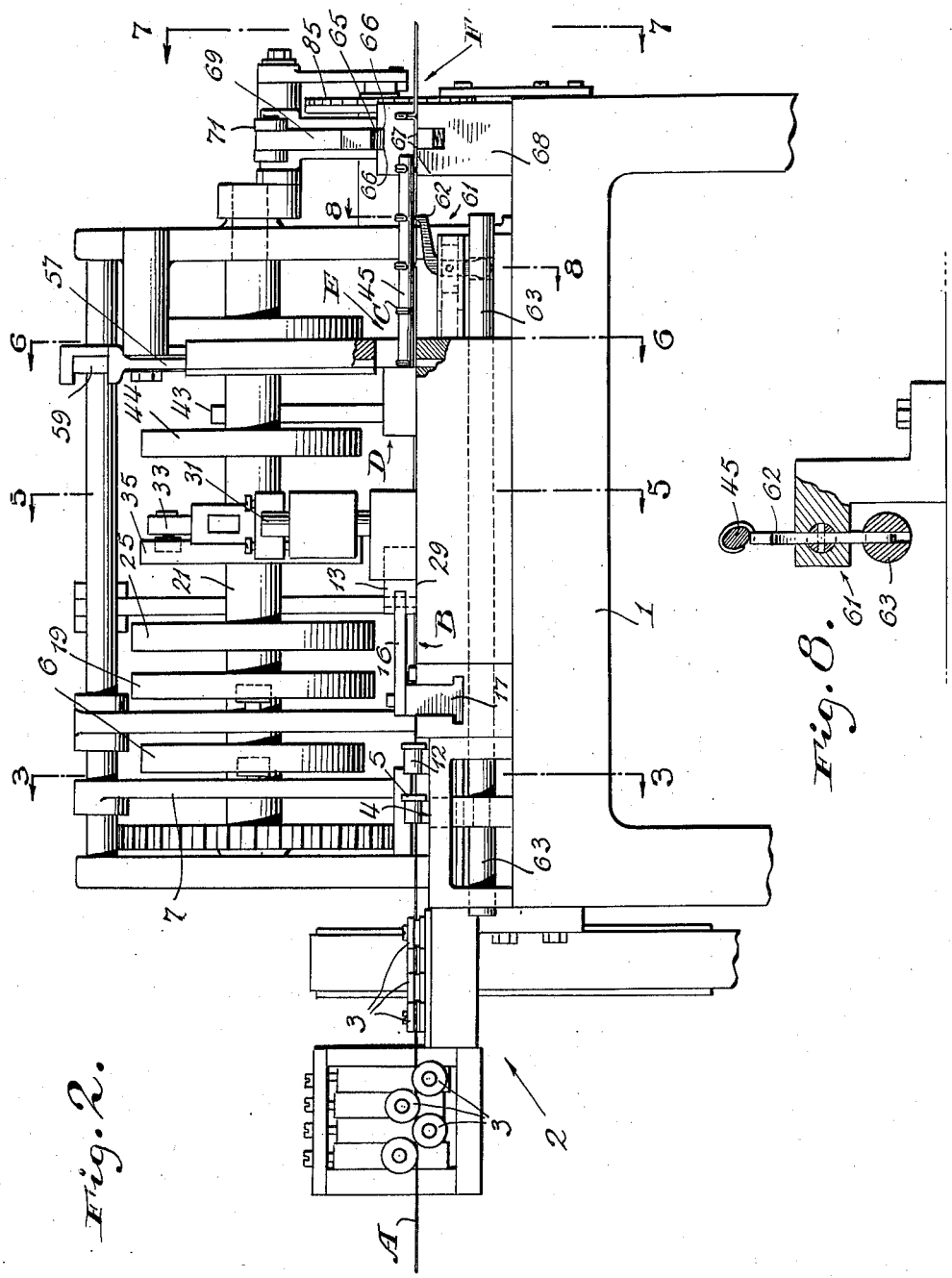

Sept. 6, 1938.  V. CATINI  2,129,605
MACHINE FOR MAKING BOOKBINDER ELEMENTS
Filed Aug. 4, 1937  6 Sheets-Sheet 3
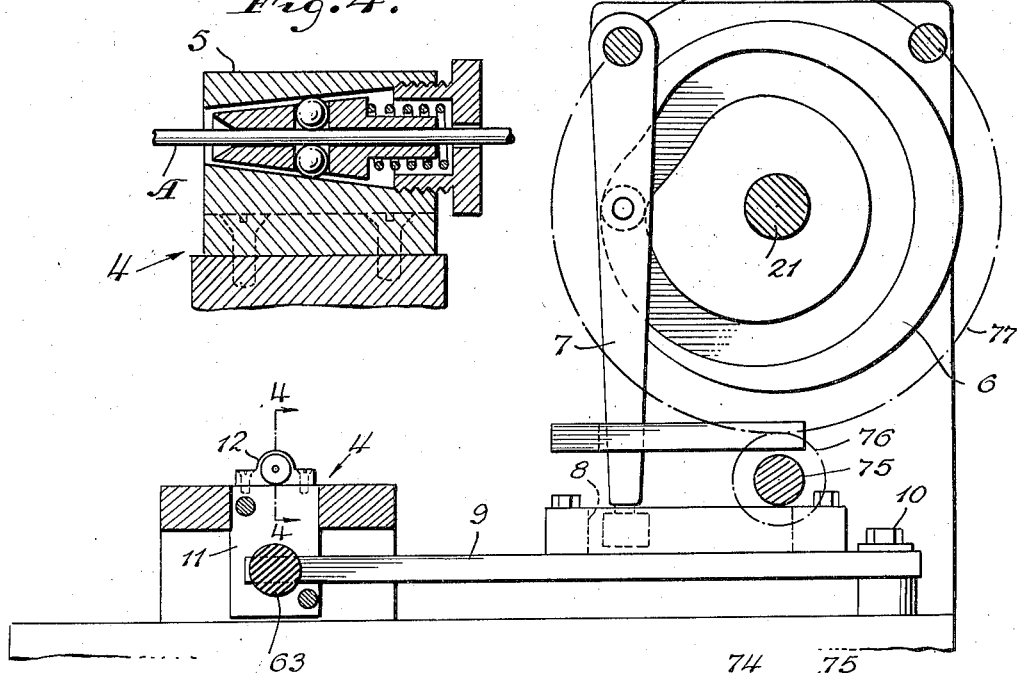
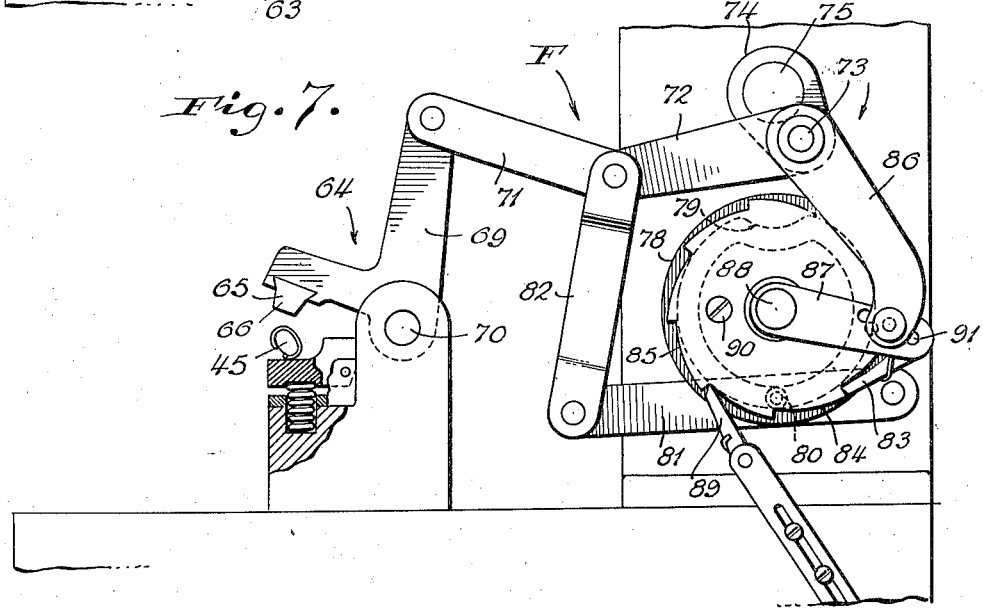
INVENTOR
VINCENZO CATINI
BY
ATTORNEYS Sept. 6, 1938. V. CATINI 2,129,605
MACHINE FOR MAKING BOOKBINDER ELEMENTS
Filed Aug. 4, 1937 6 Sheets-Sheet 4
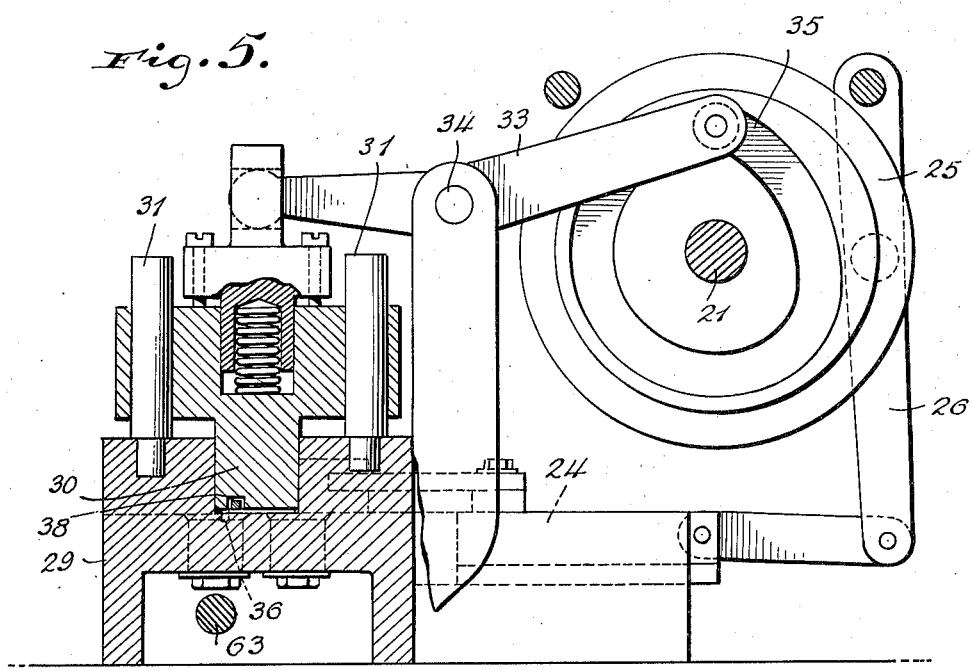
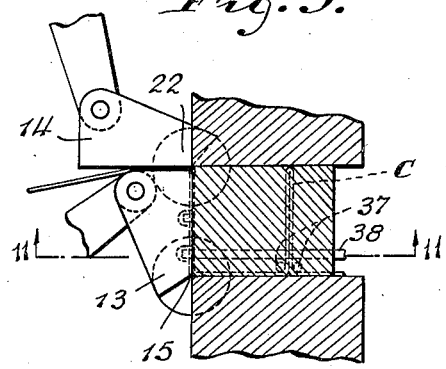
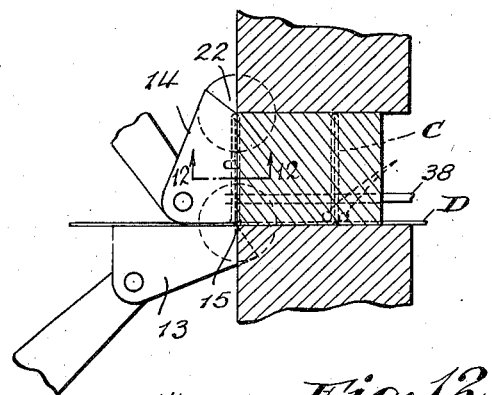
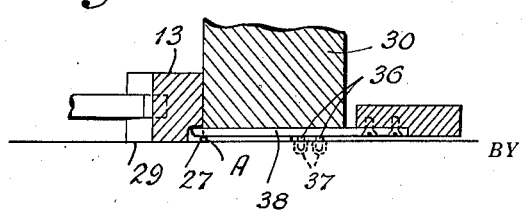
INVENTOR
VINCENZO CATINI
BY
ATTORNEYS Sept. 6, 1938. V. CATINI 2,129,605
MACHINE FOR MAKING BOOKBINDER ELEMENTS
Filed Aug. 4, 1937 6 Sheets-Sheet 5
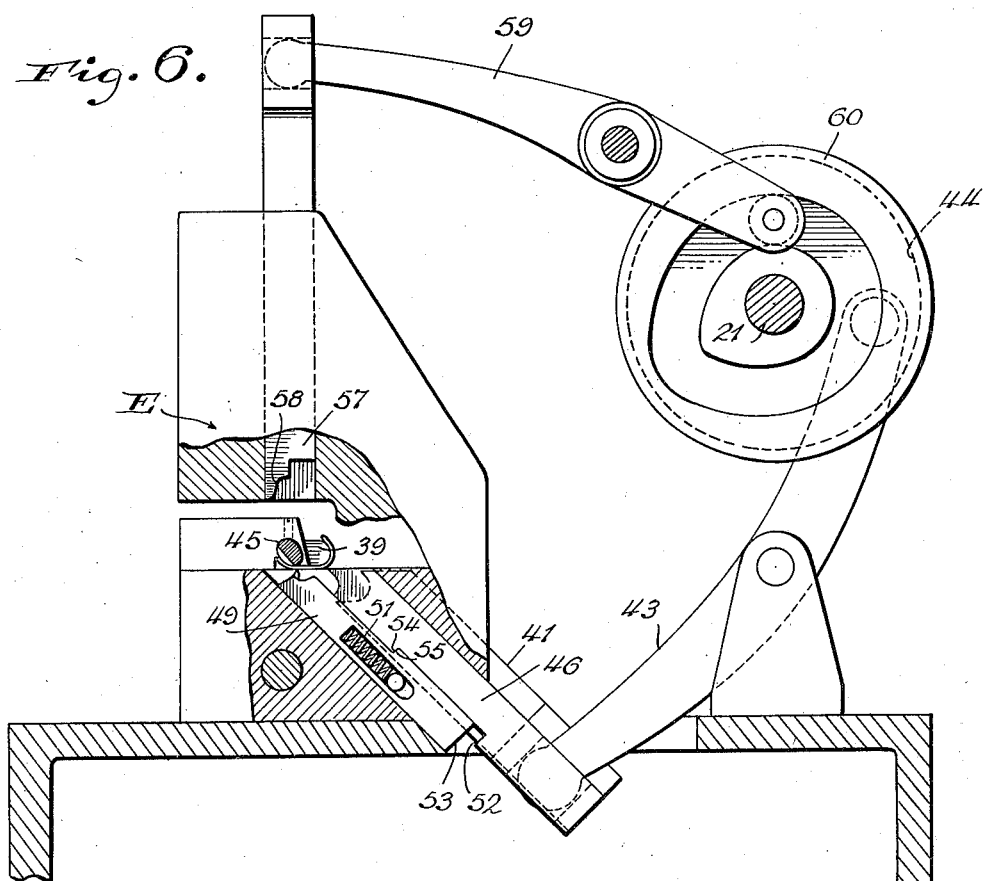
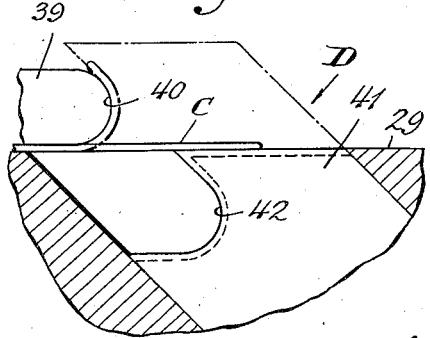
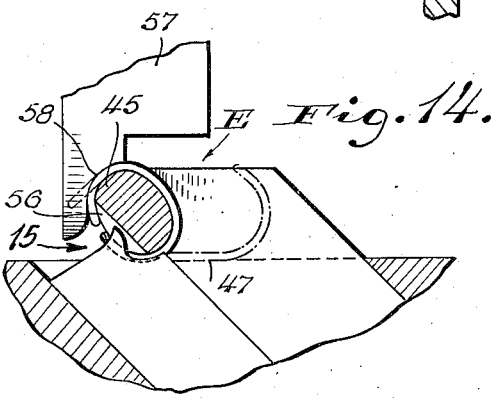
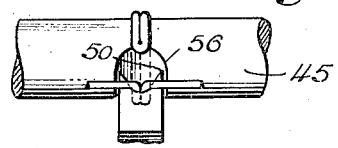
INVENTOR
VINCENZO CATINI
BY
ATTORNEYS

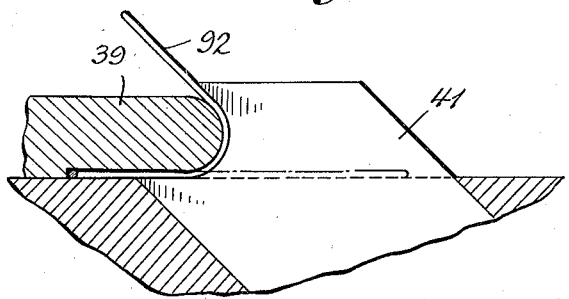
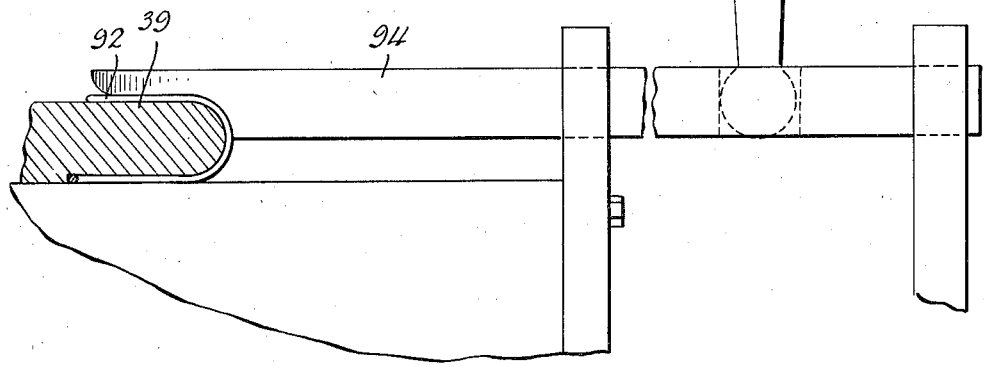
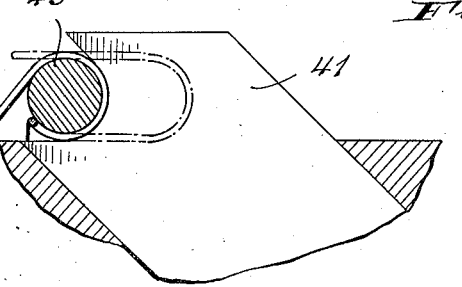
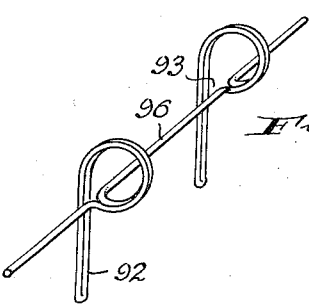
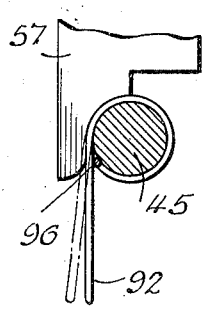

Patented Sept. 6, 1938

2,129,605

UNITED STATES PATENT OFFICE 2,129,605

MACHINE FOR MAKING BOOKBINDER ELEMENTS

Vincenzo Catini, New York, N. Y., assignor to Kamket Corporation, New York, N. Y., a corporation of New York Application August 4, 1937, Serial No. 157,292

7 Claims. (Cl. 140—71)

This invention relates to a machine for making binder elements for loose sheets of paper or the like. The binder elements, which may be made on the machine of this invention, are both of the temporary and permanent type, both of which comprise a series of duplex ringlike members united by tie rods and are of the character shown in United States Patent No. 2,078,988 and in my copending application No. 130,626, filed March 13, 1937.

It is important that such binding elements be made with great accuracy inasmuch as they are manufactured in quantities as standard devices intended for cooperation with the pages of a book which have perforations formed therein, which rings and perforations must coincide accurately in order not to tear the binding edge of the pages.

Figure 1:
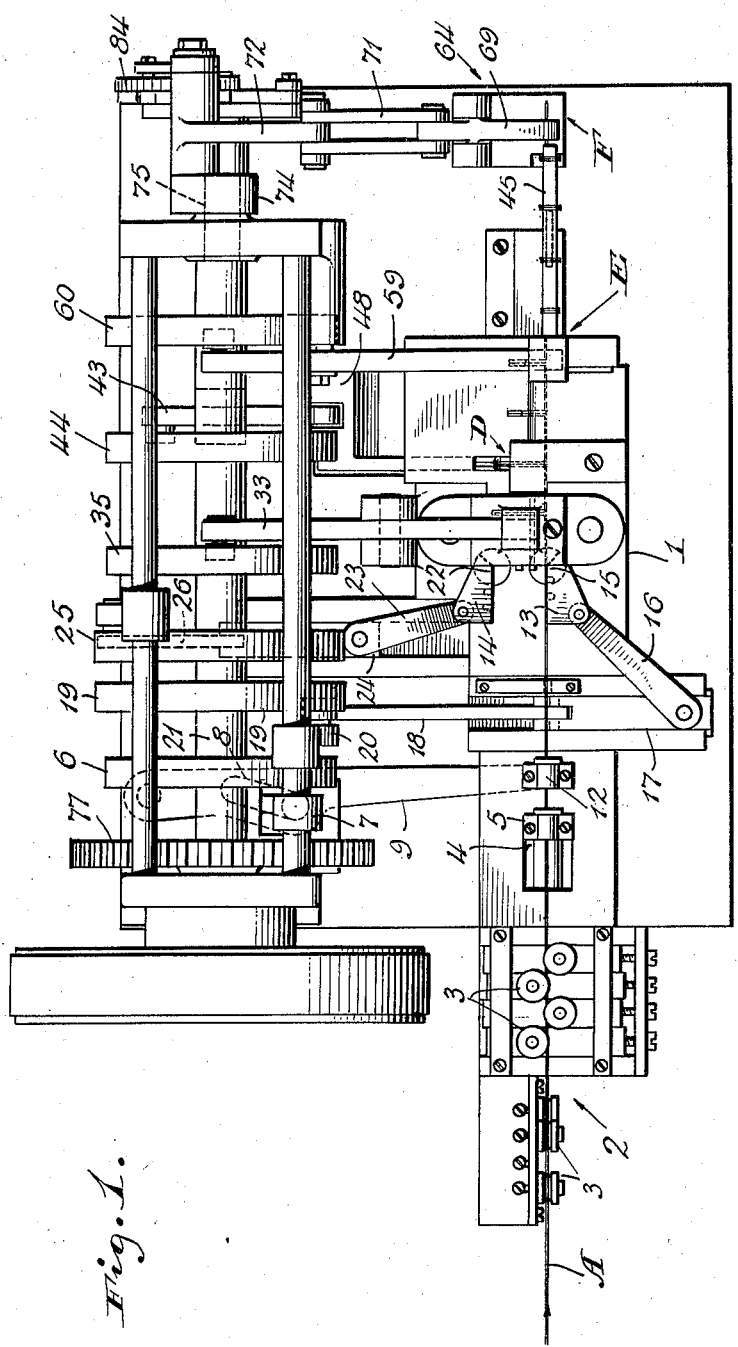
Figure 20:
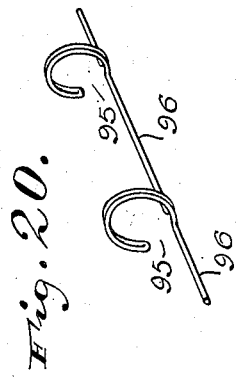

In the drawings, Fig. 1 is a top plan view of the entire machine; Fig. 2 is a front elevation thereof; Fig. 3 is a section on the line 3—3 of Fig. 2, showing the feeding device and its associated cam; Fig. 4 is a detailed section on the line 4—4 of Fig. 3, showing the feeding clutch; Fig. 5 is a section on the line 5—5 of Fig. 2, showing the holding device and its associated cam; Fig. 6 is a section on the line 6—6 of Fig. 2, showing the first, second and third ring-bending operations and the associated cams; Fig. 7 is an end elevation of the cutting device taken in the direction of the arrows 7—7; Fig. 8 is a section on the line 8—8 of Fig. 2, showing a secondary feeding device which engages the completed loops or rings and feeds them to the cutting device; Figs. 9 and 10 are detailed views of the loop-bending operation, Fig. 9 showing the first step, and Fig. 10, the second step; Fig. 11 is a section on the line 11—11 of Fig. 9; Fig. 12 is a section on the line 12—12 of Fig. 10; Fig. 13 is a detailed view, showing the first bending operation; Fig. 14 is a detailed view showing the second and third bending operations, together with the holding device for holding the loop during this operation; Fig. 15 is a front elevation of the holding device taken in the direction of the arrow 15; Figs. 16, 17, 18 and 19 are views of the forming operations in which the extended tongue type of device is made, Fig. 16 being the first operation, Fig. 17, the second, Fig. 18, the third, and Fig. 19, the fourth; Fig. 20 illustrates a permanent type of binder and Fig. 21 a temporary binder, both of which can be produced on the machine of this invention.

The machine is adapted to perform the successive operations upon an intermittently fed wire, supplied from a suitable source, such as a roll or reel (not shown), and the successive operations are performed in line as the wire passes from the wire supply to the finished article delivery end of the machine. The frame 1 of the machine at the wire supply end 2 thereof is provided with wire straightening devices comprising a series of grooved rollers 3, which straighten the wire in all planes of its travel in order that the wire is initially fed into the machine substantially straight, free of kinks and bends. The wire then passes through the feeding device 4, which is provided with a clutch 5, the details whereof are illustrated in Fig. 4. Said clutch is mounted for reciprocation and operated from the cam 6, mounted on the main drive shaft 21, acting upon the lever 7, engaging in the slot 8 carried on the lever 9, which pivoted at 10, engages the slide 11 upon which the feeding member is mounted. The wire A then passes through a clutch 12, mounted upon the stationary frame 1, which clutch is of the same general character as the clutch 5 of the feeding device, adapted to permit the wire to move forwardly but insuring against the rearward movement thereof. The wire A thus traveling in a substantially straight line, traverses the station B at which the wire is given a double bend to provide a flat tongue-like member C formed at substantially right angles to the direction of feed of the wire and comprising two parallel sections of wire joined by a bend at the forward end thereof. The initial bend in said wire is illustrated in Fig. 9 and the second bend to complete the tongue C is illustrated in Fig. 10. The formers 13 and 14 move across the tongue-forming station B with an alternate reciprocating motion and in their forward stroke each forms a bend in the wire A. The former 13 is in the form of a block is pivoted at 15 at the base of the machine and receives its reciprocating motion through the arm 16 pivotally associated with the former 13, the arm 16 being reciprocated by the movement of the slide 17 in suitable guideways by the link 18 operated in turn by the cam 19 and arm 20 (the latter being carried by the main drive shaft 21). The former 14, substantially of the same type and construction as the former 13, is also pivoted on the main frame at 22 and reciprocates under the influence of the link 23, slide 24, cam 25 and arm 26, the details whereof are shown in Fig. 5. The operating faces of the formers 13 and 14 are each provided with a groove adapted to pick up the wire and retain the same in relation to the former during the bending operation. The former 13 is provided with a groove 27 substantially of a depth equal to half the diameter of the wire A, whereas the former 14 is provided with a groove 28 equal, substantially in depth, to one and one-half times the thickness of the wire A. The formers 13 and 14 maintain a sliding relation with respect to bed plate 29 upon the surface of which the wire A moves during manipulation thereof by the formers. The movable die 30 is provided to cooperate with the formers to form the bends in the wire and to insure the proper relation thereof. The die 30 is slidably arranged over the bed plate 29, guided in its upward and downward motion by the rods 31. The under face of the die 30 is provided with a groove 32, which has a width substantially equal to one-half of the diameter of the wire. Reciprocation of the die is effected through the link 33 pivoted upon the upright arm 34, which arm is actuated by the cam 35 mounted upon the main drive shaft 21. The die 30 is provided with a pair of pins 36 in the under face thereof, which pins enter corresponding recesses 37 in the bed plate 29, and are adapted to straddle the previously finished tongue to align the same. In order to hold the tongues down against the bed plate 29 as the die retracts, the bar 38 is provided in the path of the tongues, and overlies the tongues and holds them against the bed plate 29.

The repeated step by step operations of the machine up to this point, upon the wire A, result in the production of a spaced series of tongues C, which lie substantially flat as they pass through the machine, each tongue C being made up of two sections of wire practically in surface contact, successive tongues being joined by a single wire tie rod 96. The thus completed tongues, may from their condition at the station B, be converted into binding elements of different character and function depending upon the subsequent operations performed upon the tongues. In the market it has been found that two types of binder elements are in considerable demand, namely, temporary binders which permit the ready addition and withdrawal of paper sheets therefrom and permanent binders which hold the sheets together and make it impractical to withdraw them.

The machine of this invention is readily adaptable to produce both types of binders as is hereinafter explained. The machine, as illustrated in Figs. 1 to 15, is adapted to make the permanent form of binder element, which form is illustrated in Fig. 20, and with a certain additional device, illustrated in Fig. 17, temporary binder elements may be produced.

The next succeeding operation in connection with the manufacture of the permanent type of binder involves giving the tongue C an initial curved or arc shape. The mechanism for performing this initial operation is shown in detail in Figs. 6 and 13 and operates at the station D. The bed plate 29 is provided with an anvil 39, which anvil has a face contour 40 corresponding to the proposed curvature to be given to the tongues C as they arrive at the station D. The tongues successively stop in alignment with the anvil 39, as they are fed through the machine, after being formed and while stationary in alignment with the anvil, the die 41, which is provided at its free end with a curved face 42, slides toward the anvil 39, engages the tongue and bends it to an initial curvature, as illustrated in Figs. 6 and 13. The die 41 is slidably arranged and is caused to reciprocate through the arm 43 and its actuating cam 44 driven from the main drive shaft 21. The wire tongues are successively fed to the anvil 39 and each given the initial curvature as explained. The partially formed rings, after they leave the station D, advance toward the next station E at which they are subjected to two additional operations to complete their general ringlike contour, as illustrated in Fig. 20. The machine at station E is provided with an elongated mandrel 45 capable of accommodating a multiplicity of rings and which mandrel is generally oval in cross-section, as shown in Figs. 6 and 14. The rings, after receiving their initial bend and as they are fed through the machine, slide on the end of the mandrel 45, as the partially formed rings approach the mandrel, in alignment with a second die 46, which slidably engages the portion 47 of the tongue, between the initially curved portion and the tie rod, and forms it to an oval contour, as shown by dotted lines in Fig. 14. The second die 46 is operated in unison with the die 41 through the arm 43 and the cam 44, the dies 41 and 46 being connected by the cross-arm 48. It is necessary, during the operations conducted upon the wire on the mandrel 45, that the wire be held against twisting, out of its normal plane, and for this purpose a holding device 49 is arranged in sliding relation to the die 46 in order that it be operated in unison with the reciprocation of the die 46. This holding device 49 is provided at its forward end with a pair of twin lips 50, which are adapted to lie against opposite sides of the tongues, substantially at the point of intersection of the tongues with the tie rods. The slide 49 is normally projected forwardly by the spring 51 and the final seating of the twin lips is accomplished by the engagement of the shoulder 52 against the end 53 of the slide 49. The slide 49 is retracted with the retraction of the die 46 by the engagement of the shoulder 54 on the slide 46 with the shoulder 55 on the holder 49. A recess 56 is formed in the mandrel 45 to permit the lips 50 to clear the face of the mandrel.

The third operation upon the rings results in the free end of the ring being bent downwardly and inwardly to complete the contour thereof to the configuration shown in Fig. 20 and in solid lines in Fig. 14. This final operation is accomplished by the sliding pressure member 57, which has a curved face 58 adapted to engage the free end of the ring and force it downwardly and inwardly. The pressure member 57 is reciprocated in its sliding motion through the arm 59 and the cam 60 mounted on the main drive shaft 21. The operation of the pressure member 57 takes place directly after the operation of the die 46 and before the ring has moved from alignment with the die 46 and before the holding member 49 has been retracted. The now completed open rings slide along the mandrel 45, as illustrated in Figs. 1 and 2 and ultimately slide off the end thereof toward a cutting station F. In order to facilitate the feed of the rings along the mandrel 45, inasmuch as they are closely formed thereabout, a feeding device 61 is provided in the form of a pawl 62, the end of which engages each successive ring, as shown in Fig. 8. The pawl is caused to reciprocate and in its movement toward the right, under the influence of the bar 63, feeds the formed wire toward the cutting station F. The bar 63 is caused to reciprocate in its supports by the pivoted arm 9 and the lever 7.

At the station F a cutting mechanism is arranged, which is capable of adjustment, so that it will perform the cutting operations after a certain number of rings have freely passed by it. The cutting mechanism 64 is provided with a knife 65 provided with two cutting edges 66, which come down upon the tie rod, and cooperate with the complementary edges 67 on the block 68, cut a small section from the tie rod, thereby separating a binder unit from the advancing wire. The cutter 65 is mounted on the bell crank lever 69, which is pivoted at 70, the bell crank lever being actuated through a pair of links 71 and 72 connected at 73 to the crank 74, which crank is mounted on the shaft 75 actuated by the gear 76 mounted thereupon, which gear 76 is actuated by the gear 77 mounted on the main drive shaft 21. This driving mechanism constantly causes reciprocation of the bell crank lever 69 but the full stroke of the bell crank lever to cutting operation is only effected when the links 71 and 72 are raised, so as to be in a substantially straight line, and these links are only raised when cutting is to be effected. The raising of the links 71 and 72 is accomplished by the timing cam 78, which is provided with a depression 79, which depression 79 is adapted to receive the roller 80 mounted on the arm 81, which arm 81 is connected with the links 71 and 72 by the connected link 82. The cam 78 is driven in a clockwise direction by means of the pawl 83 successively engaging teeth 84 on the ratchet plate 85 mounted on the cam 78. The pawl 83 is driven by the lever 86 connected to the crank 74, the lever 86 and the pawl 83 being connected through the arm 87 pivotally mounted at 88. It will be observed that each time the depression 79 accommodates the roller 80, the free end of the arm 81 moves upwardly and straightens out the levers 71 and 72, thereby actuating the bell crank lever 69 to its full capacity and giving the knife 65 its full cutting stroke. The holding pawl 89 engages the successive teeth 85 and prevents reverse motion of the ratchet plate 85. The ratchet plate 85 is removable by the withdrawal of the holding screws 90, permitting the substitution of a different ratchet plate in order to time the cutting stroke of the knife 65 and thereby permit a greater or lesser number of rings to pass therebeneath in order to shorten or lengthen the size of each separate binder element. In order to change the stroke of the pawl 83 to produce the proper operation of the knife 65, the arm 87 is provided with a series of holes 91 into the appropriate one of which the end of the arm 86 is adjustable, thereby increasing or decreasing the length of the stroke of the pawl 83.

It will be evident from the description of the machine in respect to the manufacture of the type of binder unit shown in Fig. 20 that the same general type of machine is adaptable for use in the manufacture of binder elements of the temporary type, shown in Fig. 21. Structurally, the difference in the permanent type of binder of Fig. 20 and the temporary type of binder of Fig. 21 resides in the retention of a flat portion 92 and an opening 93 between the tongue portion 92 and the connecting tie rod, through which opening 93 the sheets to be carried by the binding unit may be passed to engage the curved portion of the binder. In forming the temporary type of binder of Fig. 21, it is necessary to make the tongues, as they are formed by the formers 13 and 14, of greater length than aforedescribed operations and the provision of an additional operation between stations D and E. The mechanism for performing this additional operation is illustrated in Fig. 17. The operation illustrated in Fig. 16 corresponds to the operation shown in Fig. 13 at station D and the operations illustrated in Fig. 14 at station E. Intermediate the operations illustrated at Figs. 16 and 18, the machine is equipped with an additional mechanism comprising a folder 94, which cooperates with the anvil 39 after the completion of the initial bend performed by the die 41. The folder 94 slides toward the anvil 39 engaging the upstanding portion 92 of the tongue shown in Fig. 16 and forcing it downwardly against the top face of the anvil 39. The wire then moves to the station E, at which station the successive bending of the curved portion of the ring is performed, as illustrated in Figs. 18 and 19, in a manner similar to the operations illustrated in Figs. 6, 13 and 14. The wire then passes to the cutting station F, at which the binding units are cut in suitable lengths. When the implements 57, illustrated in Figs. 14 and 19, perform their final bending or squeezing operation, their action is of such a character that the metal comprising the ring portions is actually forced very close to the tie rods 96 and by reason of the springy character of the wire used, when the implements 57 are withdrawn, the metal retracts or springs back slightly to provide the opening 95 in the permanent form of binder and the opening 93 in the temporary form of binder.

The temporary form of binder, shown in Fig. 21, is complete as it leaves the cutting station F and in that form may be used as a binder element. The permanent form of binder, shown in Fig. 20, is ready for association with sheets to be bound, but it is necessary to close the ring after the sheets to be bound have been inserted. This latter operation being the subject matter of an application filed by me on August 4, 1937, Serial No. 157,291.

I claim:

1. In a machine for making book binder elements, which elements comprise a series of duplex ring-like members and tie rods connecting adjacent members, in combination, means adapted to guide wire from a source of supply, a bed, a pair of formers, said formers alternately reciprocating across the path of said wire, a bed, a die in proximity to said formers, said die being provided with wire receiving means, one of said formers being adapted to engage the wire, slide the same over said bed, bend the same against the die and deposit the bent portion in said wire receiving means, the other former being adapted to slide over said bed and engage the portion of wire adjoining said first bent portion and bend the same against the first bent portion in substantially parallel relation thereto, while the first bent portion lies in said wire receiving means.

2. In a machine of the character described in claim 1, in which both of the forming dies are provided with wire receiving means in the form of grooves.

3. In a machine of the character described in claim 1, means to feed a portion of the wire past said forming means while the forming means is stationary.

4. In a machine of the character described, a tongue forming station, a pair of formers adapted to alternately reciprocate across said tongue forming station, a die located at one side of the path of movement of said formers, wire guides adapted to guide a wire from a source of supply toward said tongue forming station, one of said formers being adapted to engage a section of the wire and bend it, in association with said die, to substantially a right angle to the normal path of movement of said wire, the other former being adapted to engage the portion of the wire adjoining said bent portion and to bend it parallel to the first bent portion and thereagainst, means to feed a straight portion of said wire across said tongue forming station while said formers are inactive, means to bend the tongue to arcuate but open configuration, said means comprising a movable member and a stationary member, said movable member forcing the tongue against the stationary member.

5. In a machine of the character described, a tongue forming station, a pair of formers adapted to alternately reciprocate across said tongue forming station, a die movable in a path at one side of the path of movement of said formers, wire guides adapted to guide a wire from a source of supply toward said tongue forming station, one of said formers being adapted to engage a section of the wire and bend it, in association with said die, to substantially a right angle to the normal path of movement of said wire, the other former being adapted to engage the portion of the wire adjoining said bent portion and to bend it parallel to the first bent portion and thereagainst, means to feed a straight portion of said wire across said tongue forming station while said formers are inactive, means to bend the tongue to arcuate but open configuration, said means comprising a movable member forcing the tongue against a stationary member, a mandrel adapted to receive said arcuately formed tongue and means cooperating with the mandrel to further bend said tongue to increase its arcuate configuration and to further bend it.

6. In a machine of the character described, a tongue forming station, a pair of formers adapted to alternately reciprocate across said tongue forming station, a die movable in a path at one side of the path of movement of said formers, wire guides adapted to guide a wire from a continuous roll across said tongue forming station, one of said formers being adapted to engage a section of the wire and bend it in association with said die to substantially a right angle to the normal path of movement of said wire, the other former being adapted to engage the portion of the wire adjoining said bent portion and to bend it parallel to the first bent portion and thereagainst, means to feed a straight portion of said wire across said tongue forming station while said formers are inactive, means to bend the tongue to arcuate configuration, said means comprising a movable member forcing the tongue against a stationary member, a mandrel adapted to receive said arcuately formed tongue and means cooperating with the mandrel to further bend said tongue to increase its arcuate configuration, a cutter adapted to operate in the path of said wire and means to operate said cutter after a plurality of duplex ring-like members have passed through the path of said cutter and sever the straight portion of the wire.

7. In a machine of the character described, a tongue forming station, a pair of formers adapted to alternately reciprocate across said tongue forming station, a die located at one side of the path of movement of said formers, wire guides adapted to guide wire from a source of supply, one of said formers being adapted to engage a section of the wire to feed the wire in the direction of movement of the former and bend it, in association with said die, at substantially a right angle to the normal path of movement of said wire, the other former being adapted to engage the portion of the wire adjoining said bent portion to feed the wire in the direction of movement of said last mentioned former and bend it parallel to the first bent portion and thereagainst, means, independent of said formers, to feed a straight portion of wire through the tongue forming station while said formers are stationary, said tongue forming means and said means for feeding a straight portion of the wire each operating successively while the other is stationary, to alternately form a multiplicity of alternately arranged, duplex open ring members and a single wire tie rod connecting adjacent rings together.

VINCENZO CATINI.